(12) United States Patent
Beyfuss et al.

(10) Patent No.: US 12,305,709 B2
(45) Date of Patent: May 20, 2025

(54) CAGE SEGMENT FOR A ROLLING-ELEMENT BEARING CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Poppenlauer (DE); Maximilian Soellner, Bundorf (DE); Jonas Schierling, Hassfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/835,124

(22) Filed: Jun. 8, 2022

(65) Prior Publication Data
US 2022/0403883 A1    Dec. 22, 2022

(30) Foreign Application Priority Data

Jun. 18, 2021  (DE) .......................... 102021206284.9

(51) Int. Cl.
*F16C 33/51* (2006.01)
*F16C 33/46* (2006.01)

(52) U.S. Cl.
CPC ............ *F16C 33/51* (2013.01); *F16C 33/467* (2013.01)

(58) Field of Classification Search
CPC .......................... F16C 33/4664; F16C 33/467; F16C 33/4676; F16C 33/50; F16C 33/51; F16C 33/513; F16C 33/54; F16C 33/548; F16C 2226/70; F16C 2226/76; F16C 2226/78
See application file for complete search history.

(56) References Cited

U.S. PATENT DOCUMENTS

| | | |
|---|---|---|
| 2,269,224 A | 1/1942 | Reilly |
| 2,417,559 A | 3/1947 | Larson |
| 2,591,160 A | 4/1952 | Kilian |
| 2,721,776 A | 10/1955 | Ture |
| 2,946,633 A | 7/1960 | Andreas |
| 3,202,467 A | 8/1965 | Karl-Albert |
| 3,313,582 A | 4/1967 | Henry |
| 3,353,246 A | 11/1967 | Farmer |

(Continued)

FOREIGN PATENT DOCUMENTS

| CN | 103415717 A | 11/2013 |
|---|---|---|
| CN | 104475350 A | 4/2015 |

(Continued)

OTHER PUBLICATIONS

Machine Translation of DE-102014219729-A1 (Year: 2016).*
(Continued)

*Primary Examiner* — Alan B Waits
(74) *Attorney, Agent, or Firm* — J-TEK LAW PLLC; Scott T. Wakeman; Mark A. Ussai (57) ABSTRACT

A single-pocket cage segment of a multipart rolling-element bearing cage includes first and second side walls connected by first and second end walls. At least one of the first and second side walls or at least one of the first and second end walls is a semi-finished profile. The semi-finished profile may include a longitudinal channel in which a portion of an auxiliary body and/or a portion of a connector may be inserted.

16 Claims, 5 Drawing Sheets

(56) References Cited

U.S. PATENT DOCUMENTS

| | | | |
|---|---|---|---|
| 3,356,428 A | 12/1967 | Ralph | |
| 3,473,857 A | 10/1969 | Pitner | |
| 3,605,247 A | 9/1971 | Bingle et al. | |
| 3,820,867 A | 6/1974 | Dickinson et al. | |
| 3,902,772 A | 9/1975 | Spate | |
| 4,397,507 A | 8/1983 | Kraus et al. | |
| 4,577,088 A | 3/1986 | Sharp | |
| 4,821,386 A | 4/1989 | Simon et al. | |
| 5,187,345 A | 2/1993 | Alling et al. | |
| 5,255,985 A | 10/1993 | Alling | |
| 5,528,706 A | 6/1996 | Harimoto et al. | |
| 5,660,485 A * | 8/1997 | Podhajecki | F16C 19/26 |
| | | | 384/572 |
| 6,330,748 B1 | 12/2001 | Müntnich et al. | |
| 6,752,535 B2 | 6/2004 | Krochak | |
| 6,883,968 B2 | 4/2005 | Fugel et al. | |
| 7,571,706 B2 | 8/2009 | Ichikawa et al. | |
| 8,696,210 B2 | 4/2014 | Kawai et al. | |
| 8,770,854 B2 | 7/2014 | Friedrich et al. | |
| 9,239,077 B2 | 1/2016 | Doki-Thonon et al. | |
| 9,382,947 B2 | 7/2016 | Ishibashi | |
| 9,429,194 B2 | 8/2016 | Reimchen | |
| 9,512,881 B2 | 12/2016 | Katayama et al. | |
| 9,551,377 B2 | 1/2017 | Haas et al. | |
| 11,149,793 B2 | 10/2021 | Friedrich et al. | |
| 2007/0248298 A1 | 10/2007 | Chihara | |
| 2008/0245631 A1 | 10/2008 | Bochen et al. | |
| 2012/0063713 A1 | 3/2012 | Beuerlein | |
| 2012/0170883 A1 | 7/2012 | Evans et al. | |
| 2013/0034321 A1 | 2/2013 | Beck et al. | |
| 2013/0308890 A1 | 11/2013 | Steblau | |
| 2015/0078699 A1* | 3/2015 | Gessendorfer | F16C 33/4605 |
| | | | 384/573 |
| 2015/0147015 A1* | 5/2015 | Yasuda | F16C 19/364 |
| | | | 384/577 |
| 2015/0159696 A1 | 6/2015 | Manne et al. | |
| 2016/0017919 A1 | 1/2016 | Haas et al. | |
| 2019/0226528 A1 | 7/2019 | Hainz et al. | |
| 2021/0372475 A1 | 12/2021 | Friedrich et al. | |
| 2022/0403883 A1 | 12/2022 | Beyfuss et al. | |
| 2022/0403885 A1 | 12/2022 | Beyfuss et al. | |
| 2022/0403886 A1 | 12/2022 | Beyfuss et al. | |
| 2023/0220877 A1 | 7/2023 | Beyfuss et al. | |
| 2023/0220879 A1 | 7/2023 | Beyfuss et al. | |

FOREIGN PATENT DOCUMENTS

| | | | |
|---|---|---|---|
| CN | 104847794 A | 8/2015 | |
| CN | 104847795 A | 8/2015 | |
| CN | 105605100 A | 5/2016 | |
| CN | 106271725 A | 1/2017 | |
| CN | 206215979 U | 6/2017 | |
| CN | 107120357 A | 9/2017 | |
| DE | 2111081 A1 | 9/1972 | |
| DE | 3130610 A1 | 2/1983 | |
| DE | 19910928 A1 | 9/2000 | |
| DE | 10065169 A1 | 7/2002 | |
| DE | 102006045436 A1 | 3/2008 | |
| DE | 102008034922 A1 | 2/2010 | |
| DE | 102009017751 A1 | 10/2010 | |
| DE | 102009034018 A1 | 12/2010 | |
| DE | 102009004657 | 2/2011 | |
| DE | 102012221097 A1 | 5/2014 | |
| DE | 102013218286 A1 | 3/2015 | |
| DE | 102014219729 A1 * | 3/2016 | F16C 33/38 |
| DE | 102015210924 A1 | 7/2016 | |
| DE | 102015206533 A1 | 10/2016 | |
| DE | 102016201052 A1 | 7/2017 | |
| DE | 102016216286 A1 | 3/2018 | |
| DE | 102016222336 A1 | 5/2018 | |
| DE | 102017117010 A1 | 7/2018 | |
| DE | 102017127529 A1 | 5/2019 | |
| DE | 102019115335 A1 | 12/2020 | |
| EP | 0074803 A1 | 3/1983 | |
| EP | 750125 A1 * | 12/1996 | F16C 19/26 |
| EP | 2213894 A1 | 8/2010 | |
| EP | 2677184 A1 | 12/2013 | |
| EP | 2839175 B1 | 5/2016 | |
| EP | 4105506 A1 | 12/2022 | |
| FR | 2234483 A1 | 1/1975 | |
| FR | 2514440 A1 | 4/1983 | |
| FR | 2612102 A1 | 9/1988 | |
| FR | 3013087 A1 | 5/2015 | |
| GB | 1431612 A | 4/1976 | |
| GB | 2103307 A | 2/1983 | |
| JP | H0742744 A | 2/1995 | |
| JP | H0742744 U | 8/1995 | |
| JP | 07317773 A | 12/1995 | |
| JP | H07317773 A | 12/1995 | |
| JP | H08270658 A | 10/1996 | |
| JP | 2005076697 A | 3/2005 | |
| JP | 2006064044 A | 3/2006 | |
| JP | 2007247856 A | 9/2007 | |
| JP | 2008215390 A | 9/2008 | |
| JP | 2008215615 A | 9/2008 | |
| JP | 2009243556 A | 10/2009 | |
| JP | 2010175074 A * | 8/2010 | F16C 33/4664 |
| JP | 4786124 B2 | 10/2011 | |
| JP | 2013007435 A | 1/2013 | |
| JP | 2013061076 A | 4/2013 | |
| JP | 2013108587 A | 6/2013 | |
| JP | 2015102131 A * | 6/2015 | |
| JP | 2017026083 A | 2/2017 | |
| JP | 6197844 B2 | 9/2017 | |
| NL | 6910823 A | 3/1970 | |
| WO | 2008040290 A1 | 4/2008 | |
| WO | 2014136816 A1 | 9/2014 | |
| WO | 2015022355 A1 | 2/2015 | |
| WO | 2018109784 A1 | 6/2018 | |

OTHER PUBLICATIONS

The website Getting Started with Aluminum Extrusions, <https://hackaday.com/2021/05/25/getting-started-with-aluminum-extrusions/> (Year: 2021).*

Machine Translation of JP-2015102131-A (Year: 2015).*

Machine Translation of JP-2010175074-A (Year: 2010).*

European Search Report from the European Patent Office dated Oct. 21, 2022 in corresponding EP application No. 22178211.3, including European Search Opinion, and translation thereof.

Laserjob, Inc., Laser Material Processing, Oct. 2012, p. 2 (Year: 2012).

Unpublished U.S. Appl. No. 18/091,491, Berthold Beyfuss, filing date: Dec. 30, 2022.

European Search Report from the European Patent Office dated Oct. 28, 2022 in corresponding EP application No. 22 178 210.5, including European Search Opinion, and translation thereof.

European Search Report from the European Patent Office dispatched Feb. 11, 2022, in related application No. EP 22178213.9, including European Search Opinion.

Extended European Search Report from the European Patent Office dispatched May 12, 2023, in related application No. EP 23150846.6, including European Search Opinion.

Extended European Search Report from the European Patent Office dispatched May 12, 2023, in related application No. EP 23150847.4, including European Search Opinion.

Office Action from the United States Patent Office mailed Jun. 1, 2023 in related U.S. Appl. No. 17/835,086.

Office Action from the United States Patent Office mailed Jun. 1, 2023 in related U.S. Appl. No. 17/835,089.

Office Action from the United States Patent Office mailed Mar. 2, 2023 in related U.S. Appl. No. 17/400,177.

Office Action from the United States Patent Office mailed Mar. 30, 2023 in related U.S. Appl. No. 17/350,081.

* cited by examiner

CAGE SEGMENT FOR A ROLLING-ELEMENT BEARING CAGE

CROSS-REFERENCE

This application claims priority to German patent application no. 10 2021 206 284.9 filed on Jun. 18, 2021, the contents of which are fully incorporated herein by reference.

TECHNOLOGICAL FIELD

The present invention relates to a cage segment for a rolling-element bearing cage that is formed from a semi-finished profile.

BACKGROUND

Rolling elements in rolling-element bearings can be guided and retained, for example, by rolling-element bearing cages. This can be of use not only in the operation of the rolling-element bearing, but also during the assembly of the rolling-element bearing. It is known that rolling-element bearing cages can be manufactured on the one hand from metal by various manufacturing methods, and on the other hand from a plastic, for example, by an injection-molding method. Due to the temperature behavior and strength required of the material, it can be necessary to use in particular a fiberglass-reinforced plastic, such as, for example, fiberglass-reinforced polyether ether ketone (PEEK). However, especially in large bearings, these rolling-element bearing cages can already be very expensive due to the material quantities required, in particular with plastics having a high price per kilogram. Larger metal cages are usually manufactured by bulk material first being rolled and then further processed by machining. "Known methods" here are understood to mean that they require on the one hand a high material usage, and on the other hand a combination of several, sometimes complex, manufacturing methods using different machine tools with the result that the manufacturing can be complex and/or cost-intensive.

SUMMARY

It is therefore an aspect of the present disclosure to provide a cage segment for a rolling-element bearing cage, which cage segment can be manufactured in a simple and cost-effective manner.

In the following a cage segment is provided for a rolling-element bearing cage, in particular for large rolling-element bearings. The cage segment can in particular be a cage segment for a roller bearing, i.e., a rolling-element bearing including roller-shaped rolling elements, such as, for example, tapered rollers, cylindrical rollers, barrels, needles, and the like. Furthermore, the cage segment comprises a receptacle or pocket for receiving a rolling element, which receptacle is delimited on at least one side by a semi-finished profile. The semi-finished profile preferably includes at least one longitudinally extending opening. In addition, the semi-finished profile can be manufactured from metal, in particular from light metal, preferably from aluminum. Especially when made of metal, the semi-finished profile may be referred to as "bar stock." The use of a light metal has the advantage that the cage segment is lighter. A large rolling-element bearing can in particular be a rolling-element bearing having a diameter of more than one meter.

The cage segment can be a single segment or a multiple segment. A rolling element can respectively be received in a single segment. A "multiple segment" is understood to mean a cage segment that can receive a plurality of rolling elements. For this purpose a plurality of pockets can be formed in the cage segment, wherein at least one rolling element can be received in one pocket.

Semi-finished profiles can be easily and cost-effectively acquired by the meter and cut to the desired dimension. A complex machine processing, such as, for example cutting and bending, and in particular a machining process method, can thereby be omitted. The cage segment can thereby be obtained with a low material use and/or a high degree of material utilization, and thus cost-effectively, in particular even with small quantities.

According to one preferred embodiment, the semi-finished profile includes at least one first side element and one second side element and a connecting element that is configured to connect the first side element and the second side element to each other. The connecting element not only makes it possible to manufacture individual sides of the cage segment from semi-finished profiles, but also to connect a plurality of elements made of semi-finished profiles.

The receptacle is preferably formed completely from a semi-finished profile. In particular, the various semi-finished profiles that are required in order to form the receptacle can be connected using connecting elements. The cage segment itself can also be formed completely from semi-finished profiles. The use of semi-finished profiles also has the advantage that the individual side elements from which the cage element is assembled are standardizable. This also makes it possible to provide a modular principle for cage segments from which each cage segment can be individually assembled. This is advantageous in particular when manufacturing small quantities. In addition, due to the use of a modular principle for cage segments, a time that is required up to the market readiness of a cage segment, of a rolling-element bearing cage, and/or of a rolling-element bearing can be reduced.

According to a further preferred embodiment, at least one element is provided that is configured to interact with the rolling element and/or a flange of the rolling-element bearing cage and/or a raceway of the rolling-element bearing cage, and/or with a coupling means, wherein the element is further configured to be releasably attachable to the semi-finished profile. For example, the element can be attachable to the semi-finished profile using the at least one longitudinally extending opening of the semi-finished profile. Furthermore, the at least one element can be manufactured from the same material as the semi-finished profile, or manufactured from a different material, such as, for example, plastic. In particular, the material used for the element can thereby be adapted to the intended function of the element. Furthermore, the at least one element can be provided with a patterning and/or texturing, depending on its intended use. Furthermore, due to the releasable attaching of the element it can be made possible that the element can be maintained. For example, in case of wear the element can be easily exchanged during a maintenance of the rolling-element bearing.

The element is preferably provided on a side facing and/or facing away from the receptacle, and/or on a side facing and/or facing away from the axis of rotation of the rolling-element bearing. In particular, the position at which the at least one element is disposed can be chosen in a manner dependent on its intended function.

According to a further embodiment, the at least one element is attachable to the semi-finished profile using at least one attachment means. The attachment means is preferably a spacer that is insertable into the at least one longitudinally extending opening of the semi-finished profile and/or a screw. For example, the at least one element can be disposed between at least two spacers in the at least one longitudinally extending opening such that the element can be held in position. Furthermore, various spacers can be provided that differ from one another in their length. The positioning of the element against the cage segment can thereby be adapted in a simple manner by a spacer having a different length being used.

The element is preferably a retaining element for a rolling element, which retaining element is configured to hold the rolling element, and/or at least one guide element that is configured to guide the cage segment against a rolling-element raceway and/or against a flange and/or against a rolling element, and/or is at least one coupling element that is configured to interact with a coupling means in order to connect the cage segment to at least one further cage segment. By changing the position of the retaining element on the cage segment, for example, with a cage segment for a tapered roller bearing, an end clearance in the bearing, which can arise, for example, due to a tolerance addition, can be compensated for by the retaining element being displaced in the axial direction. This can be achieved, for example, as mentioned above, by spacers having different lengths. In other words, in particular in a tapered roller bearing, the end clearance in the bearing, which advantageously falls in a prescribed region, but is not the same in all bearings due to the addition of the manufacturing tolerances, can be correspondingly adjusted. In particular, due to the displacement of the retaining element, the spacing or the clearance with respect to the individual tapered roller can be changed by the changing of the abutment point due to the conical shape.

The cage segments can be additionally held together by the coupling means, whereby the cage assembly gains stability and/or an installation of the cage can be simplified. The cage segments can be guided by the coupling means, which can be, for example, a cable, wire, or a ring and has a defined preload.

The coupling element can preferably be configured as an eyelet through which the coupling means is threadable. In a design of the coupling element as eyelets, the coupling means can be guided through these eyelets in a simple manner and removed again if required. Here the coupling means is not fixed to the eyelets, but rather can move in the eyelets. A clearance between the cage segments, and thus the rolling elements, and a movement of the cage segments with respect to one another is thereby not restricted. Alternatively, the eyelets can also be configured as open hooks or loops into which the coupling means is mountable or clippable or snappable.

According to a further aspect, a rolling-element bearing cage is disclosed, in particular for large rolling-element bearings, including a plurality of cage segments as described above. Here a plurality of cage segments can be connectable at least temporarily via a coupling element. Here, for example, every second rolling element can be guided in a cage segment. Alternatively a cage segment can also be provided for each rolling element. For example, the outer diameter of the rolling-element bearing cage can be more than 1200 mm.

According to a still further aspect, a rolling-element bearing, in particular a roller bearing, including at least one inner ring and at least one outer ring, wherein rolling elements are disposed between the inner ring and the outer ring, wherein the rolling elements are held by an above-described rolling-element bearing cage.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
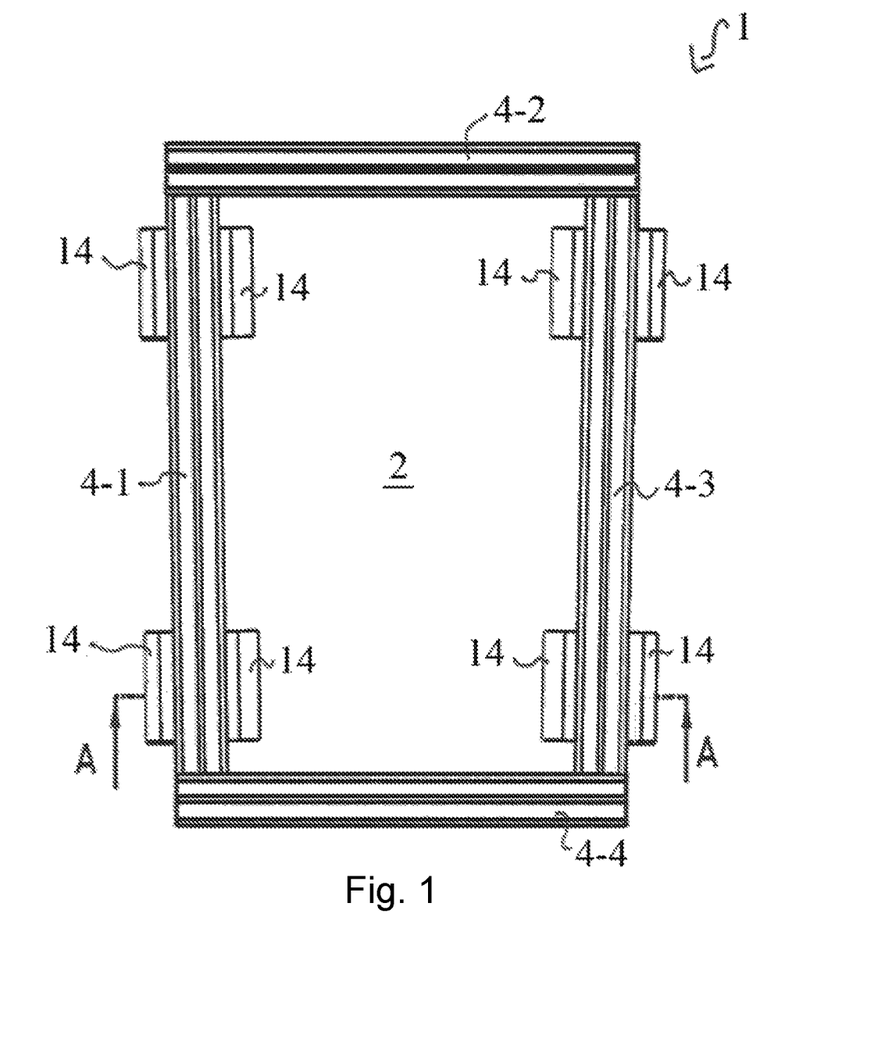
FIG. 1 is a plan view of a cage segment according to a first embodiment of the present disclosure.
Figure 2:
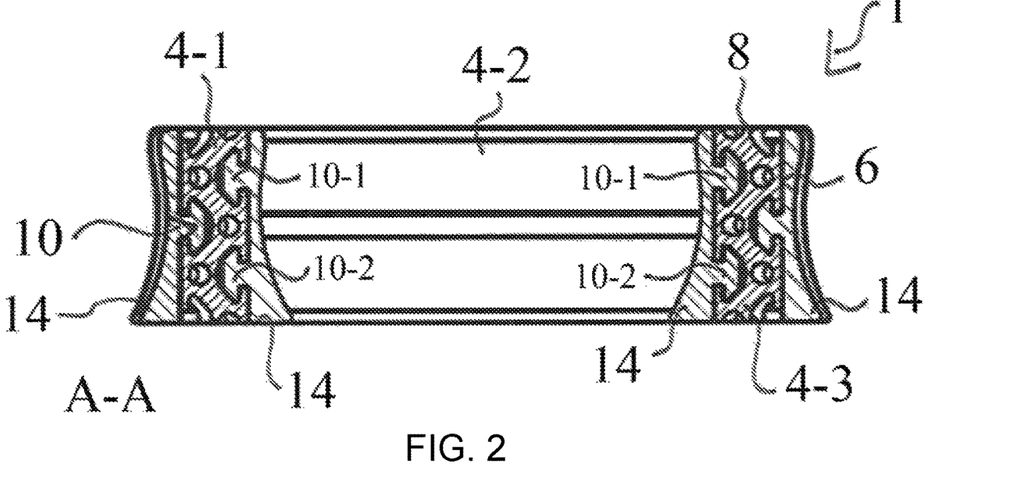
FIG. 2 is a sectional view through the cage segment of FIG. 1.
Figure 3:
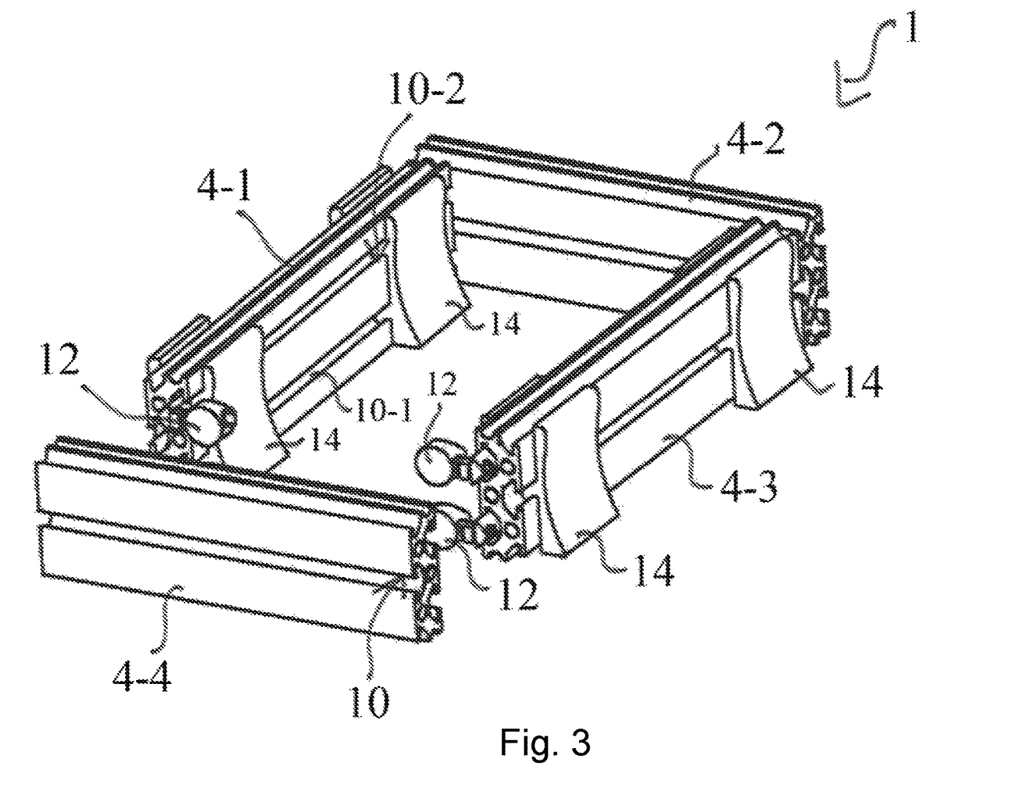
FIG. 3 is a perspective partially exploded view of the cage segment of FIG. 1.

With respect to FIGS. 1 to 3, a cage segment 1 is shown according to a first embodiment. FIG. 1 shows a plan view of the cage segment 1, FIG. 2 shows a section along the line A-A, and FIG. 3 shows a perspective exploded view of the cage segment of FIG. 1.

The cage segment 1 comprises four side elements 4-1, 4-2, 4-3, 4-4 that together form a pocket-shaped receptacle 2 that is configured to receive at least one rolling element. Here the side elements 4-1, 4-2, 4-3, 4-4 are manufactured from a semi-finished profile, which is preferably manufactured from metal, in particular from light metal, for example, aluminum, and which may comprise bar stock.

In the embodiment shown in FIGS. 1 to 3, the side elements 4-1, 4-2, 4-3, 4-4 each have the same shape, having a substantially rectangular cross-section, including two long sides 6 and two short sides 8. Alternatively side elements 4 can also be used that have a different cross-sectional shape, such as, for example, a square shape, a triangular shape, etc.

Furthermore, at least one surface of the side element 4 is provided with at least one longitudinally extending opening 10, wherein the opening is configured as a channel so that an element is insertable into the opening. Furthermore, the opening is narrowed toward the surface and is wider toward the base of the opening. In particular, two longitudinally extending openings 10-1, 10-2 are provided on a surface of a respective side element 4-1, 4-2, 4-3, 4-4. Alternatively, however, side elements 4-1, 4-2, 4-3, 4-4 made of a semi-finished profile can also be used that have more or fewer longitudinally extending openings 10.

The respective side elements 4-1, 4-2, 4-3, 4-4 are connected via corresponding connecting elements 12 (FIG. 3) in order to form the pocket-shaped receptacle 2. Here the connecting elements 12 are configured to be insertable in at least one of the longitudinally extending openings 10 and to be attached to the respective side elements 4 using an attachment means (not shown). Depending on the requirements for the cage segment 1, the attachment means can be an interference-fit, a friction-fit, or a material-bonded connection. Furthermore, the connecting elements 12 can be configured to connect two side elements 4 made of semi-finished profile at an essentially right angle, for example, when the rolling element to be received is a cylindrical roller, or at an angle different from 90 degrees, for example, when the rolling element to be received is a tapered roller.

Furthermore, two retaining elements 14 for rolling elements are provided on the side elements 4-1 and 4-3 on the side facing into the receptacle 2, and two retaining elements 14 are provided on the side facing away from the receptacle 2. The retaining elements 14 are configured to hold a rolling element in the receptacle. Here the retaining elements 14 are manufactured from the same material as the side elements 4-1 to 4-4. Alternatively, however, the retaining elements 14 can also be manufactured from another material, such as, for example, plastic. In addition, the retaining elements 14 can be provided with a surface pattern or texture in order to better retain lubricant, for example, so that lubrication of the rolling elements can be improved.

Figure 4:
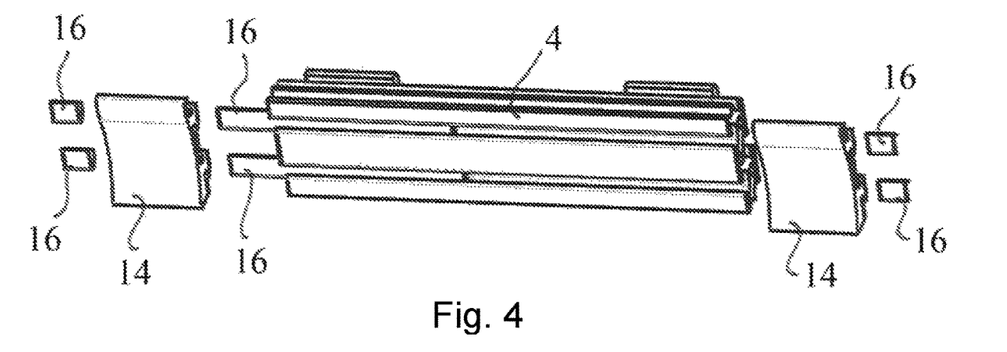
FIG. 4 is a perspective view of a detail of the cage segment of FIG. 1.

FIG. 4 shows a possibility for how the retaining element 14 can be attached to the element 4. For this purpose projections or ribs of the retaining elements 14 are pushed into at least one of the longitudinally extending openings 10 provided on the corresponding surface of the respective side element 4-1, 4-2, 4-3, 4-4, wherein a spacer 16 is inserted between the respective retaining elements 14 and between the connecting elements 12 and the retaining elements 14. This makes it possible to use the connecting elements 12 in order to clamp the retaining elements 14 via the spacers 16, and thereby hold them in position. By changing the positioning of the retaining element 14 on the respective side element 4-1, 4-3, an end clearance in the bearing, which can arise, for example, due to a tolerance addition, can be compensated for by displacing the retaining element 14 in the axial direction, i.e., toward the side elements 4-2, 4-4. This can be achieved, for example, by spacers 16 having different lengths.

Figure 5:
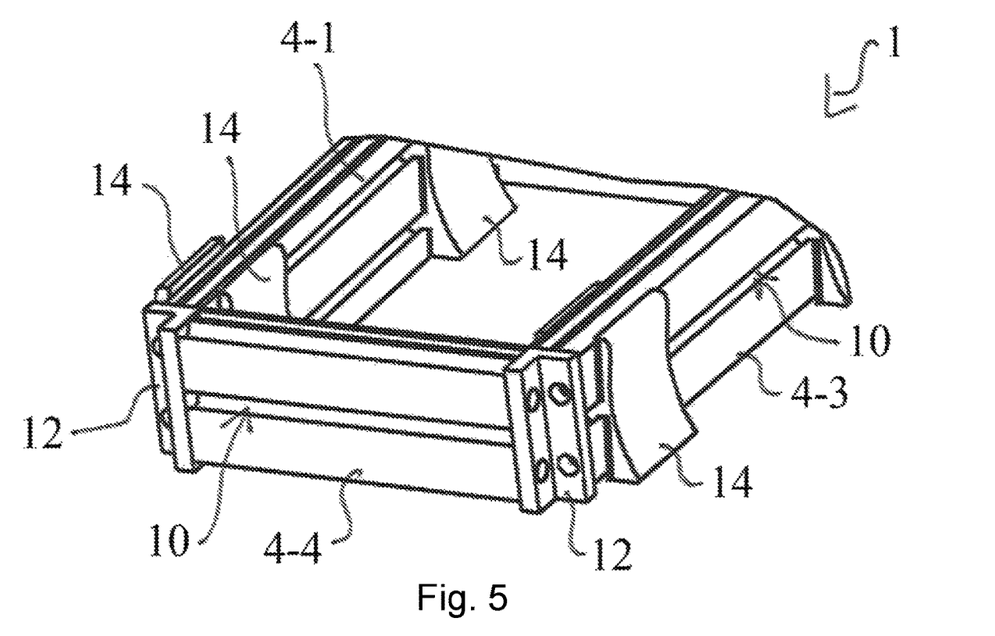
FIG. 5 is a perspective view of a region of a cage segment according to a second embodiment of the present disclosure.

FIG. 5 shows a perspective of a detail of a cage segment 1 according to a second embodiment. The cage segment of FIG. 5 differs from the cage segment 1 of FIGS. 1 to 4 by an angularly designed connecting element 12, which, in contrast to the connecting element that can be seen in FIG. 3, is not pushed into the longitudinally extending opening 10, but rather can be screwed on from outside onto the ends of the elements 4 (possibly into the longitudinally extending openings 10) in order to form the cage segment 1.

Figure 6:
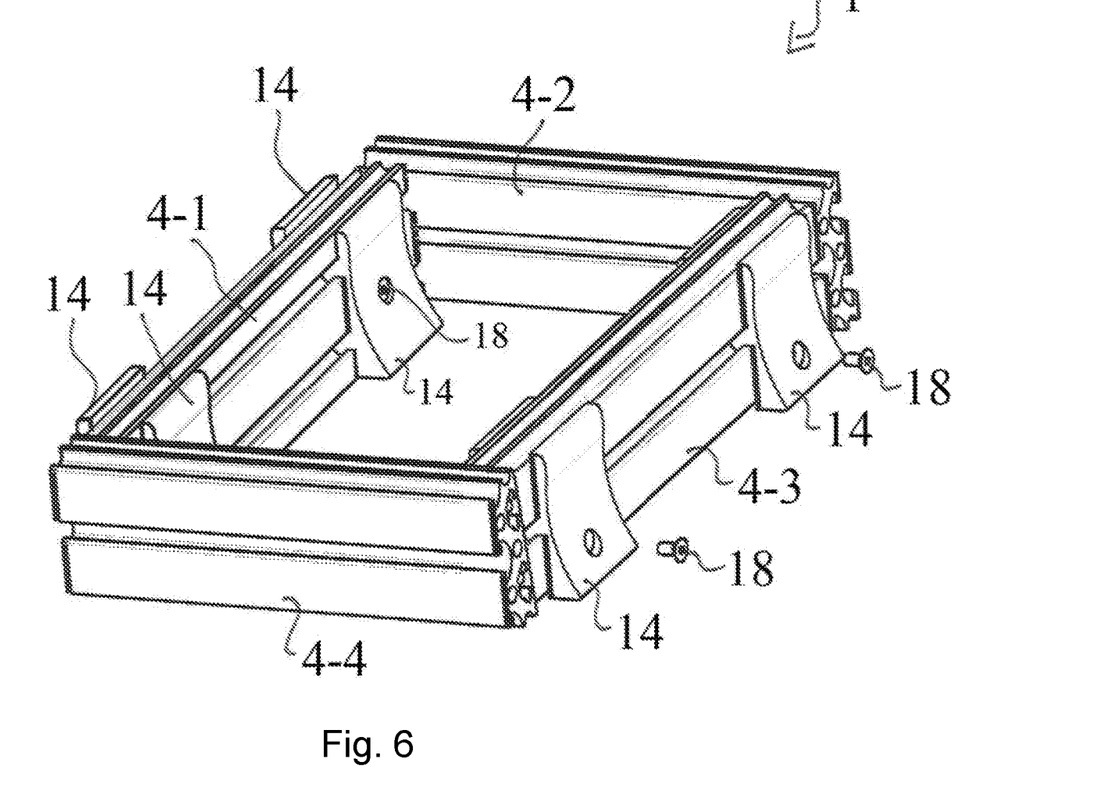
FIG. 6 is a perspective partially exploded view of a rolling-element bearing cage segment according to a third embodiment of the present disclosure.

FIG. 6 shows a further embodiment of the cage segment 1. In the cage segment 1 shown in FIG. 6, the retaining elements 14 are attached, in particular releasably, to the side element 4 using a screw 18. It can thereby advantageously be made possible to remove the retaining elements 14 for maintenance or to easily exchange them during the maintenance in case of wear.

In FIGS. 1 to 6 described above, retaining elements 14 are respectively shown as examples of elements that can be attached to the side elements 4. However, the disclosure is not limited to retaining elements for rolling elements. It is also possible to attach other types of elements to the cage segment 1 using the attachment possibilities described. For example, an element can be attached that is suitable to serve as a guide element for the cage segment. For this purpose such a guide element can be configured, for example, to interact with a rolling element, a bearing raceway, and/or a guide flange in order to guide the cage segment. Depending on the function of the attached element, it can be attached to the cage segment at a corresponding position. For example, the element can be attached to a surface of the side element 4 facing the receptacle 2, and/or a surface of the side element 4 facing away from the receptacle 2, as is shown in FIGS. 1 to 6 for a retaining element. Furthermore, the element can also be attached to a surface of the side element facing the raceway and/or the flange. Furthermore, an element can also be provided that is configured as a coupling element and interacts with a coupling means in order to connect the cage segment to at least one further cage segment. A plurality of cage segments, for example, can thereby be connected to a rolling-element bearing cage.

Figure 7:
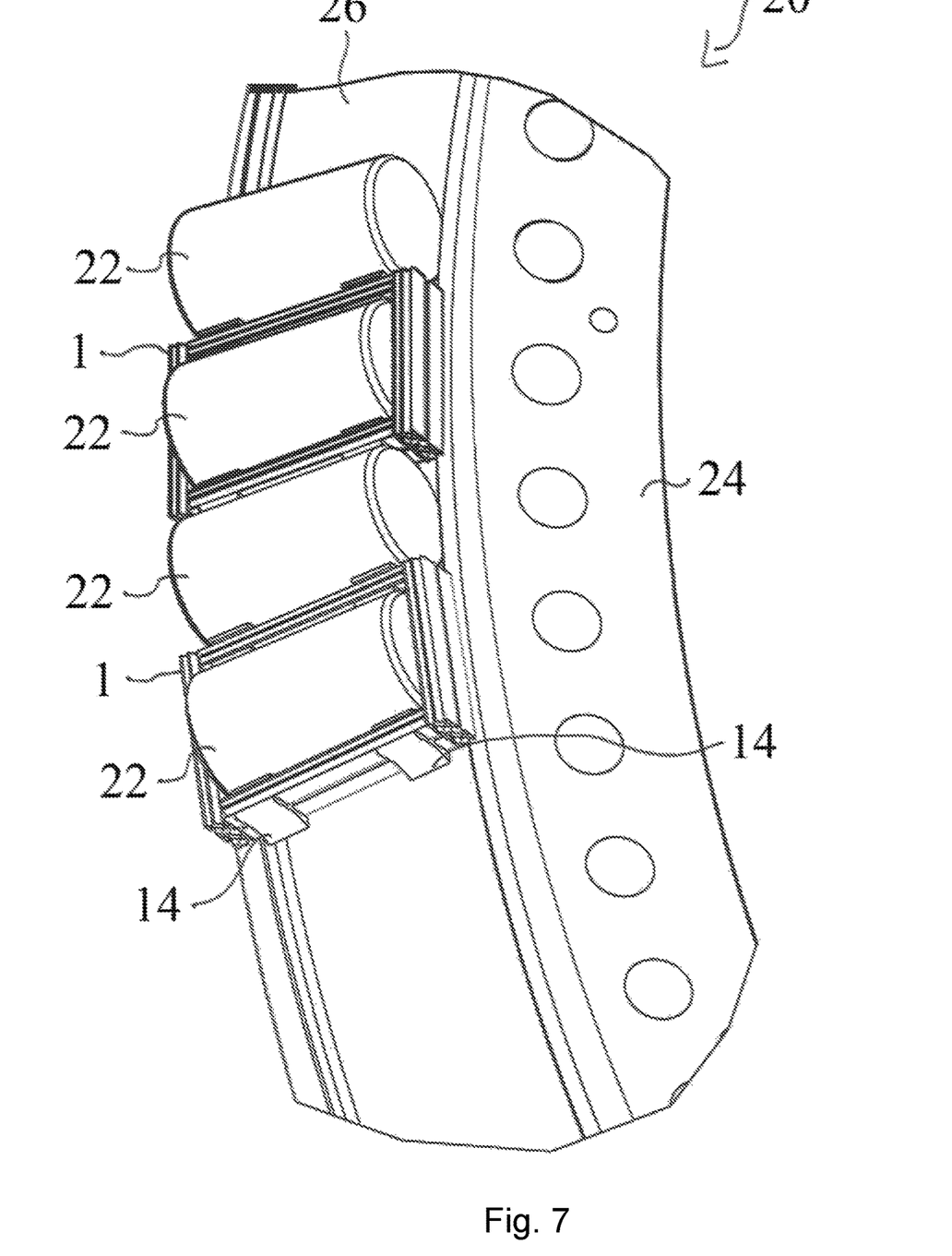
FIG. 7 is a perspective view of a portion of a rolling-element bearing cage that includes a plurality of the rolling-element bearing cages segments of FIG. 1.

FIG. 7 shows a perspective view of a section of a rolling-element bearing cage 20 that includes a plurality of bearing cage segments as discussed above. The rolling-element bearing cage 20 can preferably be used in large rolling-element bearings having a diameter of more than 1 meter. The rolling-element bearing cage 20 has a plurality of cage segments 1 as described above and a plurality of retaining elements 14, wherein the retaining elements 14, as is shown, for example, in FIG. 1, are attached both to a surface of the side element 4 facing into the receptacle 2 and to a surface of the side element 4 facing away from the receptacle 2. Therefore in the rolling-element bearing cage 20, every second rolling element 22 is guided in a receptacle 2 of the cage segment 1, while the other half of the rolling elements 22 are respectively guided between two adjacent cage segments 1. Alternatively a cage segment can also be provided for each rolling element. The rolling elements 22 roll on an inner raceway 26 of an inner ring 24 and on the outer raceway of an outer ring (not shown) of a rolling-element bearing, in order to make possible a relative rotation of the inner ring and of the outer ring.

The use of semi-finished profiles or bar stock for manufacturing the cage segment 1 makes possible the rapid and cost-effective provision of a rolling-element bearing cage since semi-finished profiles can be easily and cost-effectively acquired by the meter, and can be cut to a desired dimension. A complex machine processing, such as, for example cutting and bending, and in particular a machining process method, can thereby be avoided. The cage segment 1 can thereby be manufactured with a small material use and/or a high degree of material utilization, and thus cost-effectively, in particular even in small quantities.

The use of semi-finished profiles also has the advantage that the individual elements 4, 14 from which the cage element 1 is assembled are standardizable, in particular in the manner in which they are connectable to one another, so that the cage segment is easily adaptable for various applications. This also makes it possible to provide a modular principle for cage segments 1, from which each cage segment 1 can be individually assembled. This is advantageous in particular with small quantities. In addition, due to the use of a modular principle for cage segments 1, a time that is required up to market readiness of a cage segment 1 of a rolling-element bearing cage 20 and/or of a rolling-element bearing can be reduced.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cage segments.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cage segment
2 Receptacle
4 Element
6 Long side
8 Short side
10 Opening
12 Connecting element
14 Retaining element
16 Spacer
18 Screw
20 Rolling-element bearing cage
22 Rolling element
24 Inner ring
26 Inner raceway

What is claimed is:

1. A single-pocket cage segment of a multipart rolling-element bearing cage, the cage segment comprising:
   first and second side walls connected by first and second end walls, the first side wall meeting the first end wall at a first joint and meeting the second end wall at a second joint and the second side wall meeting the first end wall at a third joint and meeting the second end wall at a fourth joint, and
   a connecting element connecting the first side wall to the first end wall,
   wherein the single pocket is bounded by a first surface of the first side wall and a first surface of the second side wall and a first surface of the first end wall and a first surface of the second end wall,
   wherein each of the first and second side walls and each of the first and second end walls includes a longitudinally extending channel having a longitudinally extending opening and a cross-sectional shape, and
   wherein the connecting element includes a first body portion connected to a second body portion, the first body portion being slidably received in the channel of the first side wall and the second body portion being slidably received in the channel of the first end wall.

2. The cage segment according to claim 1, wherein the cage segment is configured to guide a roller element.

3. The cage segment according to claim 1,
   including a retaining element releasably attached to at least one of the first and second side walls or at least one of the first and second end walls.

4. The cage segment according to claim 3,
   wherein the retaining element is attached to the at least one of the first and second side walls or the at least one of the first and second end walls by a screw.

5. The cage segment according to claim 1,
   including a retaining element configured to guide a rolling element located inside the cage segment or located adjacent to the cage segment.

6. The cage segment according to claim 5,
   wherein the retaining element faces into the pocket.

7. The cage segment according to claim 1,
   including a retaining element attached to at least one of the first and second side walls or to at least one of the first and second end walls,
   and
   wherein the retaining element includes a rib or projection having a shape complementary to the cross-sectional shape of the channel, the rib being slidably received in the channel.

8. A rolling-element bearing cage including a plurality of cage segments according to claim 1.

9. A rolling-element bearing comprising:
   an inner ring;
   an outer ring;
   a plurality of rolling elements disposed between the inner ring and the outer ring, and
   a plurality of cage segments according to claim 1,
   wherein each of a first subset of the plurality of rolling elements is located in one of the plurality of cage segments and each of a second subset of the plurality of rolling elements is located between an adjacent pair of the cage segments.

10. The cage segment according to claim 1,
    wherein the end surface of the first end wall is perpendicular to an end surface of the first side wall.

11. The cage segment according to claim 1,
    wherein the first side wall has a second surface parallel to the first surface of the first side wall and the second side wall has a second surface parallel to the first surface of the second side wall.

12. The cage segment according to claim 11,
    wherein the first and second surfaces of the first side wall are planar.

13. A single-pocket cage segment of a multipart rolling-element bearing cage, the cage segment comprising:
    first and second side walls connected by first and second end walls, the first side wall meeting the first end wall at a first joint and meeting the second end wall at a second joint and the second side wall meeting the first end wall at a third joint and meeting the second end wall at a fourth joint,
    wherein the single pocket is bounded by a first surface of the first side wall and a first surface of the second side wall and a first surface of the first end wall and a first surface of the second end wall,
    wherein the first side wall has a second surface parallel to the first surface of the first side wall and the second side wall has a second surface parallel to the first surface of the second side wall, wherein the first and second surfaces of the first side wall are planar, wherein the first surface and/or the second surface of the first side wall includes a longitudinally extending channel having a cross-sectional shape and a longitudinally extending opening, wherein at least one retaining element is mounted to the first and/or second surface of the first side wall, the at least one retaining element having a rib or projection having a shape complementary to the cross-sectional shape of the channel slidably mounted in the channel, and wherein a surface of the at least one retaining element facing away from the first side wall is concave.

14. The cage segment according to claim 13, including a connecting element connecting the first side wall to the first end wall, wherein each of the first and second end walls includes a longitudinally extending channel having a longitudinally extending opening and a cross-sectional shape, and wherein the connecting element includes a first body portion connected to a second body portion, the first body portion being slidably received in the longitudinal channel of the first side wall and the second body portion being slidably received in the longitudinal channel of the first end wall.

15. A rolling-element bearing cage including a plurality of cage segments according to claim 13.

16. A rolling-element bearing comprising:

an inner ring;

an outer ring;

a plurality of rolling elements disposed between the inner ring and the outer ring, and a plurality of cage segments according to claim 13, wherein each of a first subset of the plurality of rolling elements is located in one of the plurality of cage segments and each of a second subset of the plurality of rolling elements is located between an adjacent pair of the cage segments.

* * * * *